(No Model.)
J. W. SNAPP.
BUSH OR WEED PULLER.
No. 496,452. Patented May 2, 1893.
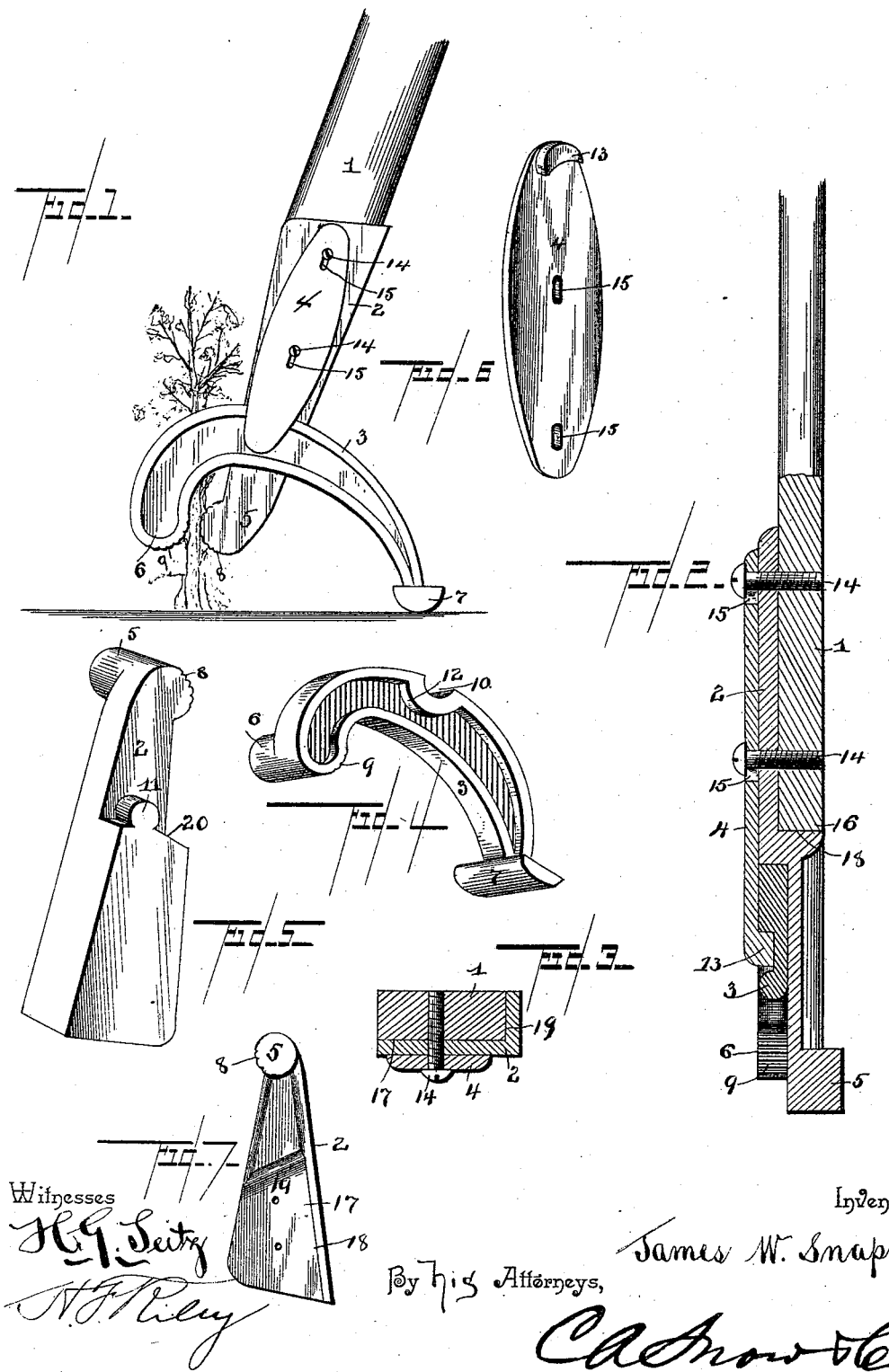

UNITED STATES PATENT OFFICE.

JAMES W. SNAPP, OF JASPER, TENNESSEE.

BUSH OR WEED PULLER.

SPECIFICATION forming part of Letters Patent No. 496,452, dated May 2, 1893.

Application filed August 22, 1891. Renewed November 8, 1892. Serial No. 451,356. (No model.)

*To all whom it may concern:*

Be it known that I, JAMES W. SNAPP, a citizen of the United States, residing at Jasper, in the county of Marion and State of Tennessee, have invented a new and useful Plant-Puller, of which the following is a specification.

The invention relates to improvements in bush and weed pullers.

The object of the present invention is to provide a simple and strong device for removing bushes, weeds, and other spontaneous growths from fields, gardens and other land, without breaking the stalks and necessitating digging up the roots.

The invention consists in the construction and novel combination and arrangement of parts, hereinafter fully described, illustrated in the accompanying drawings and pointed out in the claims hereto appended.

In the drawings—Figure 1 is an elevation of a bush puller constructed in accordance with this invention and shown applied in operative position, the stalk of a bush being clamped between the jaws. Fig. 2 is a longitudinal sectional view. Fig. 3 is a transverse sectional view. Fig. 4 is a detail perspective view of the pivoted jaw. Fig. 5 is a similar view of the rigid jaw. Fig. 6 is a detail view of the outer end of the bearing plate. Fig. 7, is a side view of the rigid jaw.

Referring to the accompanying drawings 1 designates a bar having one end shaped into a handle and having secured to its other end a stationary jaw 2 upon which is mounted a pivoted jaw 3 which is secured to the stationary jaw by a bearing plate 4. The jaws and the bearing plates are constructed of suitable metal and the stationary jaw 2 is straight and is provided at its outer ends with a cylindrical enlargement 5 and the pivoted jaw is fulcrumed intermediate its ends and is provided at one end with an enlargement 6 constructed similarly to the enlargement of the stationary jaw and the other end of the pivoted jaw is provided with a bearing block 7 having its outer face rounded and adapted to be placed upon the ground. The cylindrical enlargements 5 and 6 have their opposed faces provided with teeth 8 and 9 which are just long enough to obtain a good hold on the stalk of a bush, weed or other spontaneous growth without cutting or breaking the stalk so that the root will not be left in the ground and will not have to be dug up with a mattock. There are no sharp edges or corners to give a bite or sharp bend. The pivoted jaw 3 is provided intermediate its ends on its inner curved edge with a curved notch 10 arranged to bear on a rounded lug 11 and with a curved flange 12 extending around the curved notch at the inner side thereof and adapted to be engaged by the bearing plate 4 which is adapted to hold the pivoted jaw in contact with the rounded lug and is capable of longitudinal adjustment to take up wear and to prevent the pivoted jaw 3 becoming loose. The curved notch 10 works on the rounded lug 11 which forms a fulcrum for the pivoted jaw, and the bearing plate is provided at its outer end with a recessed lug 13 having its inner edge concavely curved and adapted to engage the flange 12 of the pivoted jaw 3. The bearing plate 4 is arranged on the stationary jaw and is secured thereto by set screws 14 which are arranged in slots 15 of the bearing plate and secure the latter in its longitudinal adjustment to take up the wear of the bearings of the pivoted jaw. The lower portion of the stationary jaw is recessed and is adapted to receive the end 16 of the bar 1 which is cut at an angle and fits in the recess 17 and the latter is formed by a shoulder 18 and a flange 19 and this arrangement greatly increases the strength of the device and enables great force to be exerted without liability of splitting the bar at its points of attachment to the stationary jaw. The outer portion of the stationary jaw is provided at its junction with the inner portion with a shoulder 20, on which the rounded lug is formed. Both the stationary jaw and the movable jaw are provided at their edges with strengthening ribs and it will be seen that by the above described manner of pivoting or journaling of the jaw 3, the parts are not weakened as would be the case were a rivet or bolt employed, and the latter in devices of this class are subjected to great strain and must necessarily be large and consequently necessitating large openings which would greatly lessen the strength of the device.

It will be seen that the device is simple, and inexpensive in construction and is strong and durable, and that rounded grasping surfaces are presented to bushes, weeds and other spontaneous growths, the same to be extracted entire without cutting and breaking the stalks and leaving the roots in the ground, which would necessitate digging with a mattock. It will also be seen that the manner of attaching the bar to the stationary jaw greatly increases the strength of the former and that during downward pressure the end and lower side of the bar are braced and supported by flanges and the obliquely arranged shoulder or flange 18 forms a dovetail recess to receive the end of the bar.

What I claim is—

1. In a bush puller, the combination of a bar, a stationary jaw secured to the bar and provided at its outer end with a cylindrical enlargement having teeth, and a pivoted jaw mounted on the stationary jaw and provided at one end with a cylindrical enlargement constructed similarly to that of the stationary jaw and provided at its other end with a fulcrum block, said cylindrical enlargements having continuous curved faces, whereby no sharp edges are presented substantially as described.

2. In a bush puller, the combination of a stationary jaw provided with a rounded lug, a pivoted jaw having a curved recess fulcrumed on the lug, and a plate secured to the stationary jaw and holding the pivoted jaw in contact with the lug, substantially as set forth.

3. In a bush puller, the combination of the stationary jaw provided with a rounded lug, a pivoted jaw having a curved recess to receive the lug and provided with a curved flange arranged around the inner side of the recess, and the bearing plate adjustably secured to the stationary jaw and provided with a recessed lug arranged to engage the flange of the pivoted jaw, substantially as and for the purpose described.

4. In a bush puller, the combination of the stationary jaw provided at its inner portion with the flange 19, and intermediate its ends with the oblique flange 18 arranged on one face of the jaw, and the shoulder 20 arranged on the opposite face of the jaw, and provided with the rounded lug arranged on the shoulder 20, the bar having one end secured to the stationary jaw and arranged adjacent the flanges 18 and 19, the pivoted jaw having a recess to engage around the lugs, the bearing plate holding the pivoted jaw in contact with the lug and provided with slots 15 and set screws arranged in the slots whereby the bearing plate is adjustably secured to the stationary jaw, substantially as described.

In testimony that I claim the foregoing as my own I have hereto affixed my signature in presence of two witnesses.

JAMES W. SNAPP.

Witnesses:
W. J. JOHNSTON,
R. T. SIMPSON.